United States Patent
Costigan et al.

(10) Patent No.: US 9,481,231 B2
(45) Date of Patent: Nov. 1, 2016

(54) AUTOMOTIVE GLASS CHANNEL BRACKET AND METHOD

(71) Applicant: GM GLOBAL TECHNOLOGY OPERATIONS LLC, Detroit, MI (US)

(72) Inventors: Terrence P. Costigan, Fenton, MI (US); James K. Platt, Flushing, MI (US); James C. O'Kane, Shelby Township, MI (US); Matthew M. Kunz, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/304,298

(22) Filed: Jun. 13, 2014

(65) Prior Publication Data
US 2015/0013233 A1    Jan. 15, 2015

Related U.S. Application Data

(60) Provisional application No. 61/844,614, filed on Jul. 10, 2013.

(51) Int. Cl.
*B60J 5/04*    (2006.01)

(52) U.S. Cl.
CPC ............ *B60J 5/0468* (2013.01); *B60J 5/0402* (2013.01); *B60J 5/0419* (2013.01); *B60J 5/0463* (2013.01); *Y10T 29/49622* (2015.01)

(58) Field of Classification Search
CPC .... B60J 5/0401; B60J 5/0402; B60J 5/0406; B60J 5/0419; B60J 5/0463; B60J 5/0468
See application file for complete search history.

(56) References Cited

U.S. PATENT DOCUMENTS

| | | | |
|---|---|---|---|
| 2,449,210 A * | 9/1948 | Faust .............................. | 49/452 |
| 4,956,942 A | 9/1990 | Lisak et al. | |
| 5,622,005 A | 4/1997 | Ochenski et al. | |
| 5,694,719 A * | 12/1997 | Bejune et al. .................. | 49/502 |
| 5,855,095 A | 1/1999 | Dedrich et al. | |
| 5,867,942 A | 2/1999 | Kowalski | |
| 5,927,021 A | 7/1999 | Kowalski et al. | |
| 5,960,588 A | 10/1999 | Wurm et al. | |
| 6,301,835 B1 | 10/2001 | Pfeiffer et al. | |
| 6,561,567 B2 | 5/2003 | Mrozowski et al. | |
| 7,246,464 B2 | 7/2007 | Castellon | |
| 8,069,610 B2 | 12/2011 | Graf et al. | |
| 8,127,493 B2 | 3/2012 | Cappelli et al. | |
| 8,209,910 B2 * | 7/2012 | Eckart et al. ................... | 49/502 |

(Continued)

FOREIGN PATENT DOCUMENTS

| CN | 1458005 A | 11/2003 |
|---|---|---|
| CN | 101120856 A | 2/2008 |

(Continued)

*Primary Examiner* — Brian Mattei
*Assistant Examiner* — Catherine A Kelly
(74) *Attorney, Agent, or Firm* — Quinn Law Group, PLLC

(57) ABSTRACT

A method includes providing a vehicle door having an inner panel, an outer panel, and a bracket assembly. The inner panel and the outer panel cooperate to define a door cavity and a window opening. The bracket assembly is mounted with respect to the inner panel inside the door cavity. The method further includes inserting the division post into the door cavity through the window opening, and engaging the division post with the bracket assembly such that the bracket assembly secures the division post to the inner panel. A corresponding door assembly is also provided.

20 Claims, 4 Drawing Sheets

(56) References Cited

U.S. PATENT DOCUMENTS

| | | |
|---|---|---|
| 8,397,433 B2 | 3/2013 | Holmes |
| 8,561,350 B2 | 10/2013 | Cardine et al. |
| 8,646,209 B2 | 2/2014 | Hampel et al. |
| 2006/0032141 A1 | 2/2006 | Daumal Castellon |
| 2006/0185247 A1 | 8/2006 | Bigourden |
| 2006/0254146 A1 | 11/2006 | Florentin et al. |
| 2007/0163177 A1 | 7/2007 | Heyer et al. |
| 2007/0169415 A1 | 7/2007 | Jain |
| 2007/0261313 A1 | 11/2007 | Ruppert et al. |
| 2007/0262607 A1* | 11/2007 | Saito .......................... 296/146.2 |
| 2011/0011005 A1* | 1/2011 | Halliwell et al. .............. 49/502 |
| 2015/0108785 A1* | 4/2015 | Yokota ...................... 296/146.5 |

FOREIGN PATENT DOCUMENTS

| | | | |
|---|---|---|---|
| CN | 101311491 A | | 11/2008 |
| CN | 101720284 A | | 6/2010 |
| CN | 101870250 A | | 10/2010 |
| CN | 102211516 A | | 10/2011 |
| CN | 202656838 U | | 1/2013 |
| DE | 102005057708 | * | 6/2007 |
| FR | 1197209 | * | 11/1959 |
| FR | 2872094 A1 | * | 12/2005 |
| GB | 1098723 A | * | 1/1968 ............... B60J 1/17 |
| JP | 2003048427 A | | 2/2003 |

* cited by examiner

US 9,481,231 B2

AUTOMOTIVE GLASS CHANNEL BRACKET AND METHOD

CROSS-REFERENCE TO RELATED APPLICATION

This application claims the benefit of U.S. Provisional Patent Application No. 61/844,614, filed Jul. 10, 2013, and which is hereby incorporated by reference in its entirety.

TECHNICAL FIELD

This disclosure relates to glass run channels for vehicle doors.

BACKGROUND

A vehicle door typically includes a window that is selectively movable between an open position and a closed position. In the closed position, the window completely obstructs a window opening. In the open position, at least part of the window opening is unobstructed. The door typically includes glass run channels that guide the movement of the window between the open and closed positions. More specifically, the glass run channels restrict the fore/aft and inboard/outboard movement of the window, while permitting up and down movement between the open and closed positions.

SUMMARY

A method includes providing a vehicle door having an inner panel, an outer panel, and a bracket assembly. The inner panel and the outer panel cooperate to define a door cavity and a window opening. The bracket assembly is mounted with respect to the inner panel inside the door cavity. The method further includes inserting the division post into the door cavity through the window opening, and engaging the division post with the bracket assembly such that the bracket assembly secures the division post to the inner panel.

A door assembly includes an inner panel and an outer panel. The inner panel and the outer panel cooperate to define a door cavity. A bracket assembly is operatively connected to the inner panel and configured to engage a division post thereby to secure the division post with respect to the inner panel. The method and the apparatus enable a division post to be inserted through the relative narrow slot formed between the inner panel and the outer panel at the belt line without an attachment feature attached thereto, thereby facilitating the passage of the division post through the slot. After the division post is inserted through the slot and into the door cavity, an operator can then simply engage the division post with the bracket assembly to fasten the division post to inner panel.

The above features and advantages and other features and advantages of the present disclosure are readily apparent from the following detailed description of the best modes for carrying out the disclosure when taken in connection with the accompanying drawings.

DETAILED DESCRIPTION

Figure 1:
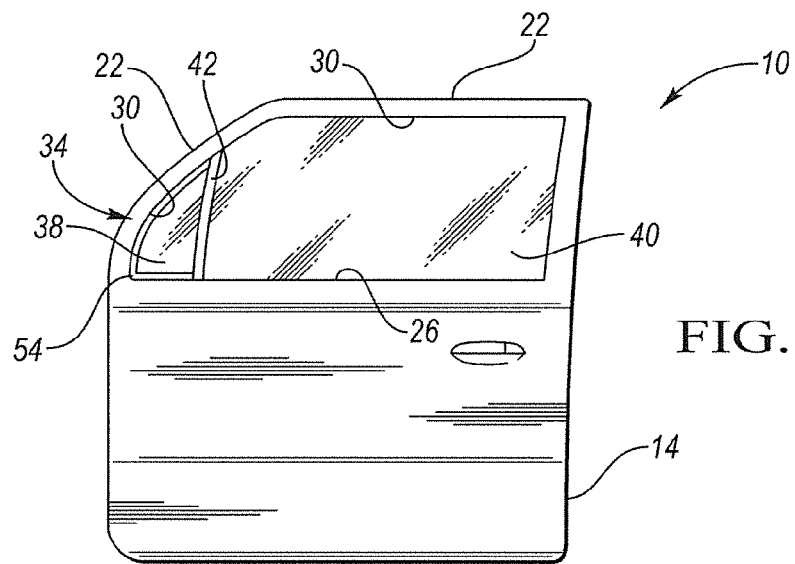
FIG. 1 is a schematic side view of a vehicle door including a division post.

Referring to FIG. 1, a vehicle door 10 is schematically depicted. The vehicle door 10 includes an outer panel 14 that defines the exterior surface of the door 10. The outer panel 14 cooperates with an inner panel (shown at 18 in FIG. 2) to define a window frame 22. The window frame 22 and the belt line 26 of the door 10 define a window opening 30. The door 10 includes a window assembly 34 having a fixed window pane 38 and a movable window 40. The fixed window pane 38 is fixed and is not movable with respect to the inner panel 18 and the outer panel 14, and, in the embodiment depicted, obstructs the forward portion of the window opening 30. A division post 42 separates the fixed window pane 38 and the movable window 40.

Figure 2:
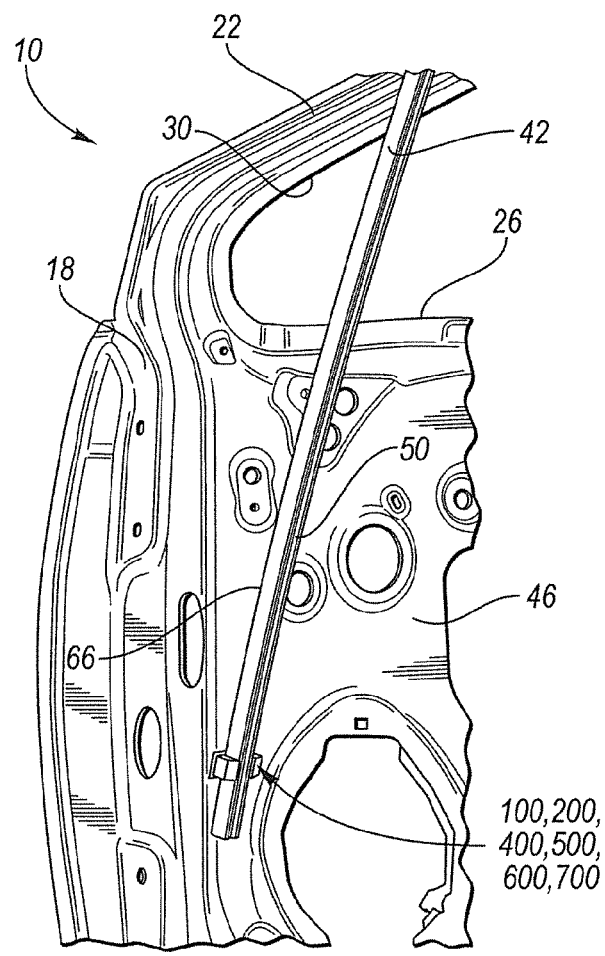
FIG. 2 is a schematic side view of the inner panel of the vehicle door of FIG. 1.

Referring to FIGS. 1 and 2, the inner and outer panels 14, 18 cooperate to define a door cavity 46 therebetween and below the belt line 26. The movable window 40 is movable between a closed position, as shown in FIG. 1, in which the movable window 40 cooperates with the fixed pane 38 to obstruct the opening 30, and an open position in which the movable window descends into the door cavity 46 and leaves at least some of the opening 30 unobstructed.

To guide the movement of the window 40 up and down between the open and closed positions, the door 10 includes two glass run channels; the division post 42 forms the entire front glass run channel 50. It should be noted that, in the embodiment depicted, the division post 42 is formed of a single piece of material that extends from the lowest extent of the channel 50 to inside the window opening 30. The division post 42 extends from the window frame 22, across the window opening 30, and into the cavity 46.

In the embodiment depicted, the division post 42 is part of a preassembled module (i.e., preassembled prior to installation in the door 10) that includes the fixed pane 38, and a frame and seal assembly 54 around the fixed pane 38; however, the division post 42 may or may not be subassembled to the fixed pane 38 within the scope of the claims.

The division post 42 extending from the window frame 22 to the lower terminus of the glass run channel 50, and being attached to the fixed pane 38 as part of a preassembly module, creates limitations on how the division post 42 is installed in the door 10. More particularly, the size and shape of the division post 42, and the entirety of the preassembled module, requires that the division post 42 be inserted into the door cavity 46 through the window opening 30, and, more particularly, through the narrow slot at the bottom of the window opening 30 at the belt line 26. The division post 42 must be attached to the inner panel 18 to secure and stabilize the glass run channel 50; however, the slot at the belt line 26 at the bottom of the window opening 30 is too narrow to permit any fastening features attached to the division post 42 to pass therethrough. Furthermore, resolving this issue by using a separate glass run channel bolted or welded inside the door cavity 46 may interfere with installation of other door components, such as the grommet for the electrical wiring harness.

Figure 3:
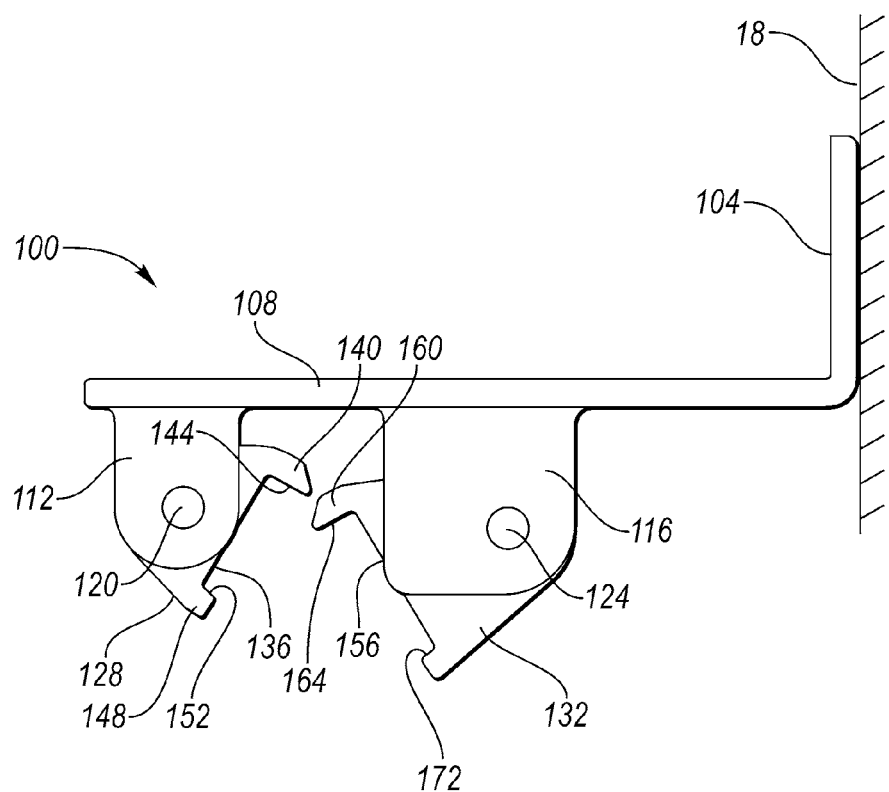
FIG. 3 is a schematic, top view of a bracket assembly including two clamp members in respective first positions.
Figure 4:
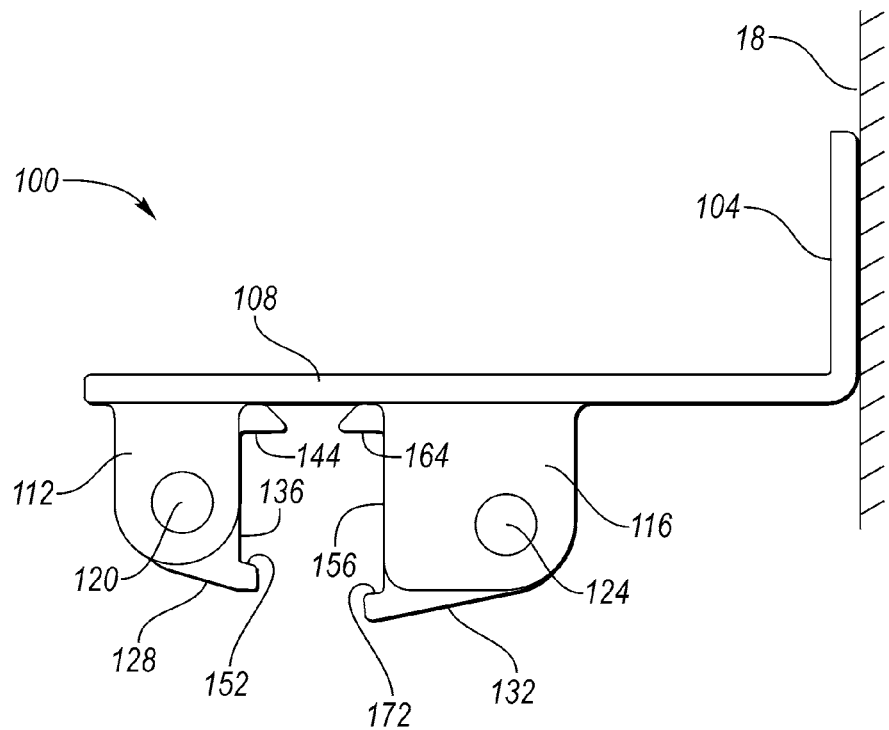
FIG. 4 is a schematic, top view of the bracket assembly of FIG. 3 with the two clamp members in respective second positions.
Figure 5:
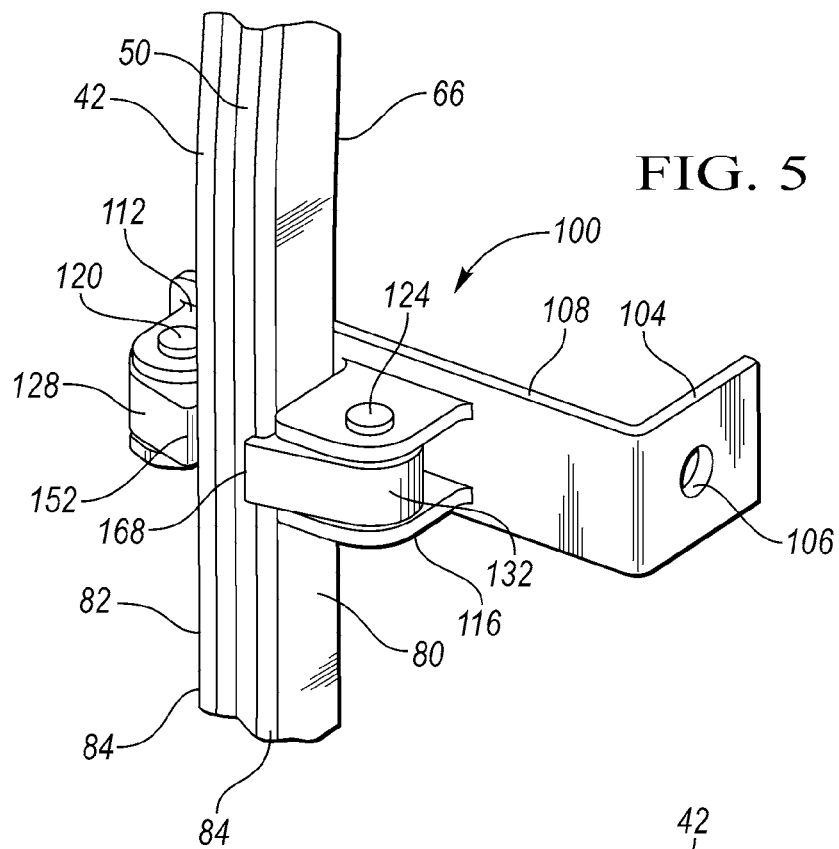
FIG. 5 is a schematic, perspective view of the bracket assembly of FIG. 3 with the two clamp members in their respective second positions and the division post between the two clamp members.

Referring to FIGS. 3-5, wherein like reference numbers refer to like components from FIGS. 1 and 2, a bracket assembly 100 is schematically depicted. The bracket assembly 100 facilitates the installation of the division post 42. More specifically, the bracket assembly 100 includes a first portion 104 that is mounted to the inner panel 18 (such as via a bolt passing through hole 106 formed through portion 104), and a second portion 108 that extends outboard from the first portion 104 into the door cavity. Portion 108 supports two hinges 112, 116. Each hinge 112, 116 includes a respective pivot pin 120, 124. A first clamp member 128 is rotatably supported by hinge 112 for rotation about pivot pin 120, and a second clamp member 132 is rotatably supported by hinge 116 for rotation about pin 124.

Clamp member 128 defines a surface 136. A protuberance 140 on one side of the surface 136 defines surface 144, which is perpendicular to surface 136. Another protuberance 148 on the other side of surface 136 defines surface 152, which is perpendicular to surface 136, and which faces surface 144.

Similarly, clamp member 132 defines a surface 156. A protuberance 160 on one side of the surface 156 defines surface 164, which is perpendicular to surface 156. Another protuberance 168 on the other side of surface 156 defines surface 172, which is perpendicular to surface 156, and which faces surface 164.

When the clamp members 128, 132 are in a first position as shown in FIG. 3, the division post 42 may be inserted between the clamp members 128, 132. As the division post 42 is pressed toward the portion 108 of the bracket 100 (i.e., forward with respect to the vehicle), the clamp members are rotated about pivot pins 120, 124 to a second position as shown in FIGS. 4 and 5. In the positions shown in FIGS. 4 and 5, surface 136 contacts outboard surface 82, surface 156 contacts inboard surface 80, surfaces 144 and 164 contact forward surface 66, and surfaces 152 and 172 contact surface 84, thereby retaining the division post 42 to the inner panel 18. It should be noted that, within the scope of the claims, only one clamp member may be employed. For example, clamp member 128 and hinge 112 may be replaced by a stationary protuberance from the second portion 108 that contacts surface 80.

Figure 6:
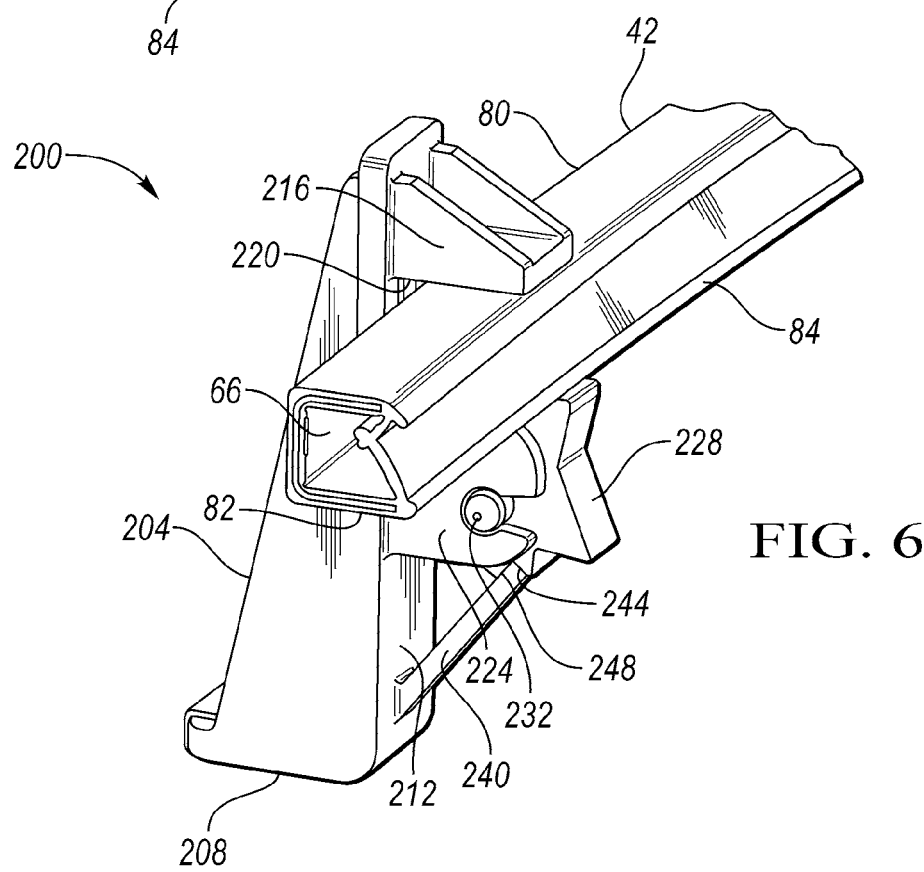
FIG. 6 is a schematic, perspective view of a first alternative bracket assembly with the division post operatively connected thereto.

Referring to FIG. 6, another bracket assembly is shown schematically at 200. The bracket assembly 200 includes a bracket member 204 that is mounted to the inner panel at one end 208, such as via a threaded fastener (not shown). Surface 212 of the bracket member 204 faces rearward (relative to the vehicle in which the division post 42 is installed). A protrusion 216 from surface 212 defines surface 220. Hinge 224 also extends from surface 212. Clamp member 228 is selectively rotatable about a pivot pin 232 in hinge 224.

Clamp member 228 includes surfaces identical to the surfaces 156, 164, and 172 of clamp member 132 in FIG. 4. Clamp member 228 also functions in a manner similar to clamp member 132; when the clamp member 228 is in the same position as clamp member 132 in FIG. 3, the division post 42 may be pressed between the clamp member 228 and the protrusion 216, causing the clamp member 228 to rotate to the position shown in FIG. 6.

As shown in FIG. 6, the clamp member 228 contacts surfaces 82 and 84 of the division post 42, surface 212 of the bracket member 204 contacts surface 66 of the division post 42, and surface 220 of the protrusion 216 contacts surface 80 of the division post 42, thereby securing the division post 42 with respect to the inner panel.

The bracket assembly 200 also includes a locking portion 240 that extends from surface 212 at approximately a forty-five degree angle. The locking portion 240 snaps into a recess formed by surfaces 244, 248 of the clamp member 228 when the clamp member 228 is rotated into the position shown in FIG. 8 during installation of the division post 42. Interference between the locking portion 240 and surface 244 prevents rotation of the clamp member 228 from the position shown in FIG. 8.

The embodiments of FIGS. 3-6 enable the division post 42 to be inserted through the relatively narrow slot formed between the inner panel 18 and the outer panel 14 at the belt line 26 without an attachment feature attached thereto, thereby facilitating the passage of the division post 42 through the slot. After the division post 42 is inserted through the slot and into the door cavity 46, an operator can then simply push the division post 42 against the clamp member 228 to fasten the division post 42 to inner panel 18. A continuous channel 50, created by the full-length division post 42, may also aid express glass operation and improve operator access to the front of the door for electrical harness installation.

Thus, in FIGS. 1-6, a method is shown including providing a vehicle door 10 having an inner panel 18, an outer panel 14, and a bracket assembly (100 or 200). The inner panel 18 and the outer panel 14 cooperate to define a door cavity 46 and a window opening 30. The bracket assembly (100 or 200) is mounted with respect to the inner panel 18 inside the door cavity 46. The method also includes inserting the division post 42 into the door cavity 46 through the window opening 30, and engaging the division post 42 with the bracket assembly (100 or 200) such that the bracket assembly secures the division post 42 to the inner panel 18.

The bracket assembly (100 or 200) includes a clamp member (e.g., 128 or 228) having a first surface 136 and a second surface 144, the second surface 144 being generally perpendicular to the first surface 136. The clamp member (100 or 200) is selectively rotatable between a first position and a second position. Engaging the division post 42 with the bracket assembly (100 or 200) includes moving the division post 42 into contact with the first surface 136 of the clamp member thereby causing the clamp member to rotate from the first position to the second position. The second surface 144 prevents the removal of the division post 42 from the bracket assembly (100 or 200) when the clamp member is in the second position. Bracket assembly 200 includes a locking mechanism 240 that prevents movement of the clamp member 228 from the second position to the first position.

Figure 7:
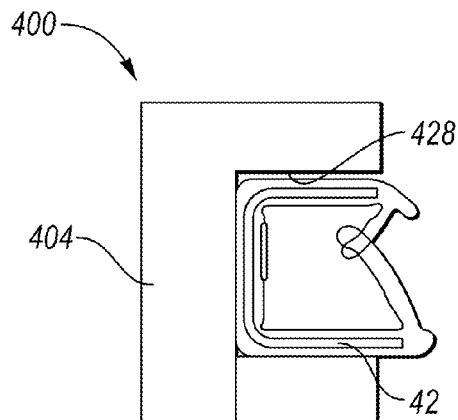
FIG. 7 is a schematic, cross-sectional top view of yet a second alternative bracket assembly.

Referring to FIG. 7, another alternative bracket assembly 400 that may be employed with the method is schematically depicted. The bracket assembly 400 includes a first member 404, a second member 408, and a threaded fastener 412. The first member 404 is mounted with respect to the inner panel (shown at 18 in FIGS. 1 and 2) and defines a first hole 416 that is threaded. It should be noted that, as used herein, a "member" may be one-piece or may be multiple pieces operatively connected. In the embodiment depicted, the first hole 416 is at least partially defined by a nut 420.

The second member 408 defines a second hole 424 and cooperates with the first member 404 to define a generally C-shaped concavity 428. The threaded fastener 412 extends through the second hole 424 and into the first hole 416. Rotation of the threaded fastener 412 causes the second member 408 to move closer to the first member 404, thereby decreasing the size of the concavity 428 and thus compressing anything inside the concavity 428.

Engaging the division post 42 with the bracket assembly 400 includes inserting the division post 42 into the concavity 428 as shown and turning the threaded fastener 412 such that the second member 408 exerts a clamping force on the division post 42 inside the concavity 428.

Figure 8:
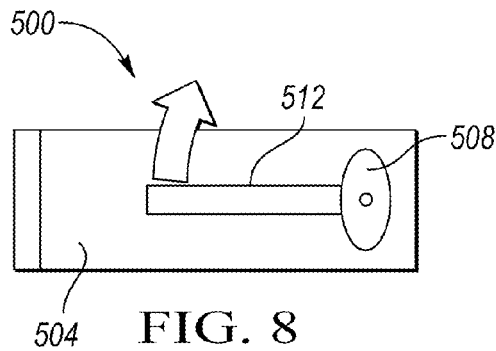
FIG. 8 is a schematic, side view of a third alternative bracket assembly.
Figure 9:
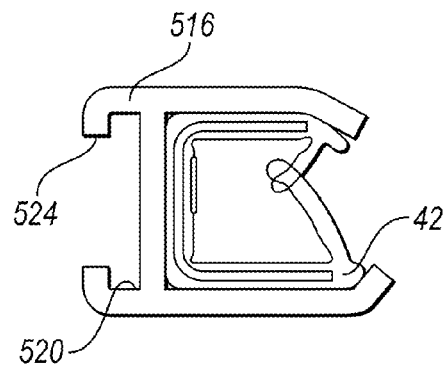
FIG. 9 is a schematic, cross-sectional, top view of a division post for use with the third alternative bracket assembly of FIG. 8.

Referring to FIG. 8, another alternative bracket assembly 500 that may be employed with the method is schematically depicted. The bracket assembly 500 includes a bracket member 504 that is mounted to the inner panel (shown at 18 in FIG. 2) inside the door cavity 46. The bracket assembly 500 also includes a selectively rotatable cam 508 rotatably connected to the bracket member 504. In the embodiment depicted, the cam 508 has a handle 512 attached thereto in order to facilitate rotation of the cam 508 by an operator. Referring to FIG. 9, a member 516 is mounted to the division post 42. The member 516 defines a generally C-shaped channel 520. The channel 520 is characterized by an opening 524 that is narrower than the channel 520. The opening 524 is sufficiently wide to permit the cam 508 to pass therethrough when the cam 508 is positioned with its narrowest portion aligned properly, but rotating the cam 508 degrees would not permit the cam 508 to pass therethrough.

Engaging the division post 42 with the bracket assembly 500 includes positioning the division post 42 such that the cam 508 is inserted into the C-shaped channel 520, i.e., via opening 524, and subsequently rotating the cam 508 such that the cam 508 cannot be withdrawn through the opening 524, thereby locking the member 516 and the division post 42 with respect to the inner panel 18.

Figure 10:
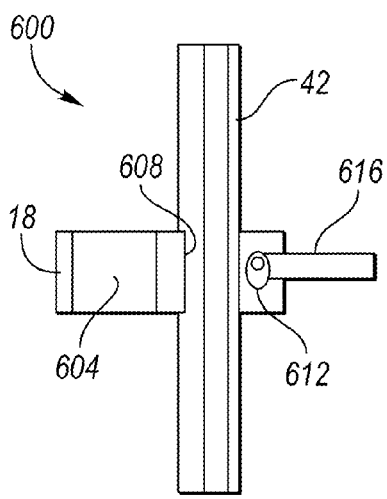
FIG. 10 is a schematic, side view of a fourth alternative bracket assembly.
Figure 11:
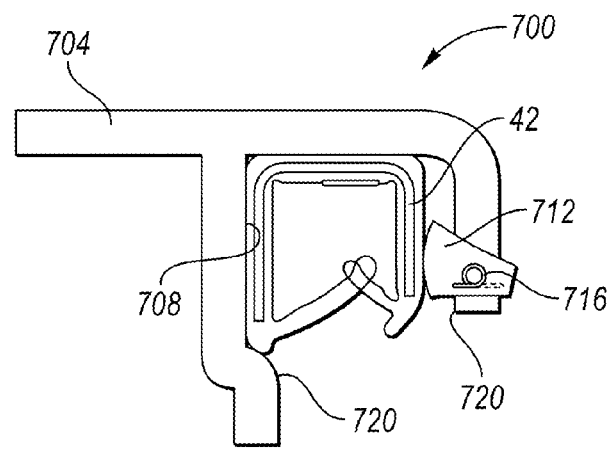
FIG. 11 is a schematic, top view of a fifth alternative bracket assembly.

FIGS. 10 and 11 depict respective alternative bracket assembly embodiments having cams that interact with the division post 42 to interfere with movement of the division post 42 relative to the inner panel 18. Referring to FIG. 10, bracket assembly 600 includes a bracket member 604 that is mounted to the inner panel 18, and that defines a generally C-shaped concavity 608. A selectively rotatable cam 612 is mounted to the bracket member 604. A handle 616 is mounted to the cam 612 to facilitate rotation of the cam 612. Engaging the division post 42 with the bracket assembly 600 includes positioning the division post 42 into the concavity 608 and rotating the cam 612 such that the cam 612 locks the division post 42 inside the concavity 608.

Referring to FIG. 11, bracket assembly 700 includes a bracket member 704 that is mounted to the inner panel, and that defines a generally C-shaped concavity 708. A selectively rotatable cam 712 is mounted to the bracket member 704. The bracket assembly 700 includes a torsion spring 716 that biases the cam 712 to an initial position. The cam 712 is positioned such that an object entering the concavity 708 through its opening 720 contacts the cam 712 and causes the cam 712 to rotate against the biasing force of the spring 716 to the position shown in FIG. 11. Thus, movement of the division post 42 into the concavity 708 causes the rotation of the cam 712 such that the cam 712 exerts a compressing force on the division post 42, thereby securing the division post 42 against the bracket member 704 and, correspondingly, the inner panel 18.

While the best modes for carrying out the disclosure have been described in detail, those familiar with the art to which this disclosure relates will recognize various alternative designs and embodiments for practicing the disclosure within the scope of the appended claims.

The invention claimed is:

1. A method comprising:
providing a vehicle door having an inner panel, an outer panel, and a bracket assembly;
the inner panel and the outer panel cooperating to define a door cavity and a window opening;
the bracket assembly being mounted relative to the inner panel inside the door cavity, wherein the bracket assembly includes a component extending outwardly away from the inner panel and a member selectively rotatable relative to the component, and wherein the bracket assembly defines a slot that has a constant size regardless of a position of the member relative to the component during rotation of the member;
inserting a division post into the door cavity through the window opening and into the slot of the bracket assembly such that a first segment of the division post is disposed in the slot, a second segment of the division post is disposed entirely above the slot and a third segment of the division post is disposed entirely below the slot; and
rotating the member relative to the division post such that the member directly engages the division post to secure the division post in the slot and relative to the inner panel.

2. The method of claim 1, wherein the member is further defined as a first clamp member;
wherein the first clamp member is selectively rotatable between a first position and a second position; and
wherein inserting the division post into the slot includes moving the division post into direct contact with the first clamp member which causes the first clamp member to rotate from the first position to the second position; and
wherein direct contact between the first clamp member and the division post when in the second position prevents the removal of the division post from the bracket assembly.

3. The method of claim 1, wherein inserting the division post into the door cavity includes inserting the division post into the door cavity without passing a fastening feature with the division post into the door cavity.

4. The method of claim 1 wherein the slot is open to the door cavity along a first side and a second side opposing the first side, and wherein the slot is open to the door cavity along a third side disposed transverse and adjacent to the first and second sides, and the slot is closed along a fourth side by the component, with the fourth side opposing the third side; and
wherein inserting the division post into the slot includes the division post entering the slot from the third side and moving toward the fourth side.

5. The method of claim 2, wherein the bracket assembly further includes a second clamp member spaced from the first clamp member, with the second clamp member selectively rotatable relative to the component independently of rotation of the first clamp member; and wherein inserting the division post into the slot includes rotating the first and second clamp members in opposite directions independently of each other as the division post directly contacts the first and second clamp members.

6. The method of claim 5 wherein the bracket assembly includes a first hinge and a first pivot pin supported by the first hinge, with the first clamp member rotatable about the first pivot pin between the first and second positions, and wherein the bracket assembly includes a second hinge and a second pivot pin supported by the second hinge, with the first and second pivot pins spaced from each other, with the slot disposed between the first and second hinges; and
wherein rotating the first and second clamp members includes rotating the first clamp member about the first pivot pin and the second clamp member about the second pivot pin in opposite directions as the division post directly contacts the first and second clamp members.

7. The method of claim 5 wherein the first and second clamp members each have a respective first surface and a respective second surface, with the second surface of respective clamp members being generally perpendicular to the first surface of respective clamp members;
wherein the second clamp member is selectively rotatable between a first position and a second position;
wherein inserting the division post into the slot includes moving the division post into direct contact with the first surface of the first and second clamp members which causes the first and second clamp members to rotate from the first position to the second position; and
wherein the second surface of the first and second clamp members prevents the removal of the division post from the bracket assembly when the first and second clamp members are in the second position.

8. The method of claim 7 wherein the first and second clamp members each have a respective first protuberance and a respective second protuberance, with the first and second protuberances of the respective clamp members spaced from each other to define a recess therebetween, with the first and second surfaces of the respective clamp members disposed in the recess of respective clamp members; and
wherein rotating the member relative to the division post includes capturing the division post between the first and second protuberances of the first and second clamp members within the recess of the first and second clamp members.

9. The method of claim 2 wherein the bracket assembly includes a protrusion that extends from the component and is spaced from the first clamp member, with the protrusion being stationary; and
wherein inserting the division post into the slot includes moving the division post into direct contact with the first clamp member which causes the first clamp member to rotate relative to the protrusion from the first position to the second position.

10. The method of claim 9 wherein the bracket assembly includes a first hinge and a first pivot pin supported by the first hinge, with the first clamp member rotatable about the first pivot pin between the first and second positions with the slot disposed between the first hinge and the protrusion; and
wherein rotating the first clamp member includes rotating the first clamp member about the first pivot pin as the division post directly contacts the first clamp member, and capturing the division post between the first clamp member and the protrusion.

11. The method of claim 9 wherein the first clamp member has a first surface and a second surface, with the second surface generally perpendicular to the first surface;
wherein inserting the division post into the slot includes moving the division post into direct contact with the first surface of the first clamp member which causes the first clamp member to rotate from the first position to the second position; and
wherein the second surface of the first clamp member prevents the removal of the division post from the bracket assembly when the first clamp member is in the second position.

12. The method of claim 11 wherein the first clamp member has a first protuberance and a second protuberance spaced from the first protuberance to define a recess therebetween, with the first and second surfaces disposed in the recess; and
wherein rotating the member relative to the division post includes capturing the division post between the first and second protuberances of the first clamp member within the recess.

13. The method of claim 9 wherein the bracket assembly further includes a locking portion that is disposed outside of the slot and is movable independently of the first clamp member, with the locking portion configured to lock the first clamp member in the second position such that the division post is retained in the slot and relative to the inner panel;
rotating the locking portion from a position spaced from the first clamp member to a position engaging the first clamp member to lock the first clamp member in the second position; and
wherein rotating the locking portion to engage the first clamp member occurs after rotating the first clamp member from the first position to the second position.

14. The method of claim 13, wherein the locking portion extends from a surface of the component to a distal end spaced from the component, and wherein the first clamp member includes a recess facing away from the protrusion,
wherein engaging the first clamp member to lock the first clamp member includes the distal end of the locking portion directly engaging the first clamp member in the recess to lock the first clamp member in the second position.

15. The method of claim 1, wherein the member is further defined as a cam; and
wherein rotating the member relative to the division post includes rotating the cam into direct engagement with the division post to retain the division post in the slot and relative to the inner panel.

16. The method of claim 15, wherein a handle is permanently fixed to the cam;
wherein rotating the cam includes rotating a handle which correspondingly rotates the cam.

17. A door assembly comprising:
an inner panel;
an outer panel;
the inner panel and the outer panel cooperating to define a door cavity and a window opening;
a bracket assembly mounted relative to the inner panel inside the door cavity, wherein the bracket assembly includes a component extending outwardly away from the inner panel and a member selectively rotatable relative to the component, and wherein the bracket assembly defines a slot that has a constant size regardless of a position of the member relative to the component during rotation of the member;

a division post inserted into the door cavity through the window opening and into the slot of the bracket assembly such that a first segment of the division post is disposed in the slot, a second segment of the division post is disposed entirely above the slot and a third segment of the division post is disposed entirely below the slot; and wherein the member is rotated relative to the division post such that the member directly engages the division post to secure the division post in the slot and relative to the inner panel.

18. The door assembly of claim 17, wherein the bracket assembly includes at least one clamp member configured such that when the division post is pressed against the at least one clamp member, the at least one clamp member rotates to a position that retains the division post in the slot and relative to the inner panel.

19. The door assembly of claim 18, wherein the bracket assembly further includes a locking portion that is disposed outside of the slot and is movable independently of the at least one clamp member, with the locking portion configured to lock the at least one clamp member in the position at which the division post is retained in the slot and relative to the inner panel by directly engaging the clamp member.

20. The door assembly of claim 17, wherein the member is further defined as a cam that is directly engageable with the division post to retain the division post in the slot and relative to the inner panel.

* * * * *